(No Model.)

W. KUEBLER.
REVERSING MECHANISM.

No. 510,031.  Patented Dec. 5, 1893.

Witnesses;
Sidney P. Hollingsworth
Baltus De Long.

Inventor,
Willibald Kuebler,
by his attorneys
Baldwin, Davidson & Wight.

THE NATIONAL LITHOGRAPHING COMPANY,
WASHINGTON, D. C.

UNITED STATES PATENT OFFICE.

WILLIBALD KUEBLER, OF EASTON, PENNSYLVANIA.

REVERSING MECHANISM.

SPECIFICATION forming part of Letters Patent No. 510,031, dated December 5, 1893.

Application filed September 11, 1893. Serial No. 485,250. (No model.)

*To all whom it may concern:*

Be it known that I, WILLIBALD KUEBLER, a citizen of the United States, residing at Easton, in the county of Northampton and State of Pennsylvania, have invented certain new and useful Improvements in Reversing Mechanism, of which the following is a specification.

The object of my invention is to provide improved devices for automatically reversing the motion of driving mechanism.

My invention particularly relates to that class of machines in which a belt is employed to convey power to a driving shaft, and in which a belt shipper is used to shift the belt from one pulley to another to reverse the movement of a driving shaft. Some parts of the mechanism involved in my invention may, however, be employed to automatically reverse the motion of a shaft or other mechanism, by operating suitable clutch mechanism.

In carrying out my invention, I provide a shipping rod which may carry a belt shifter, or which may be connected with suitable clutch mechanism and to this rod I connect a pivoted frame which carries a rail on which runs a pulley, from which is suspended a weight. Mechanism operated by the driving shaft is provided for shifting the position of the frame, so as to cause the weight to move along the rail to counter-balance the frame and effect the movement in the desired direction of the shipping rod.

The details of construction will be more fully hereinafter described.

Figure 1:
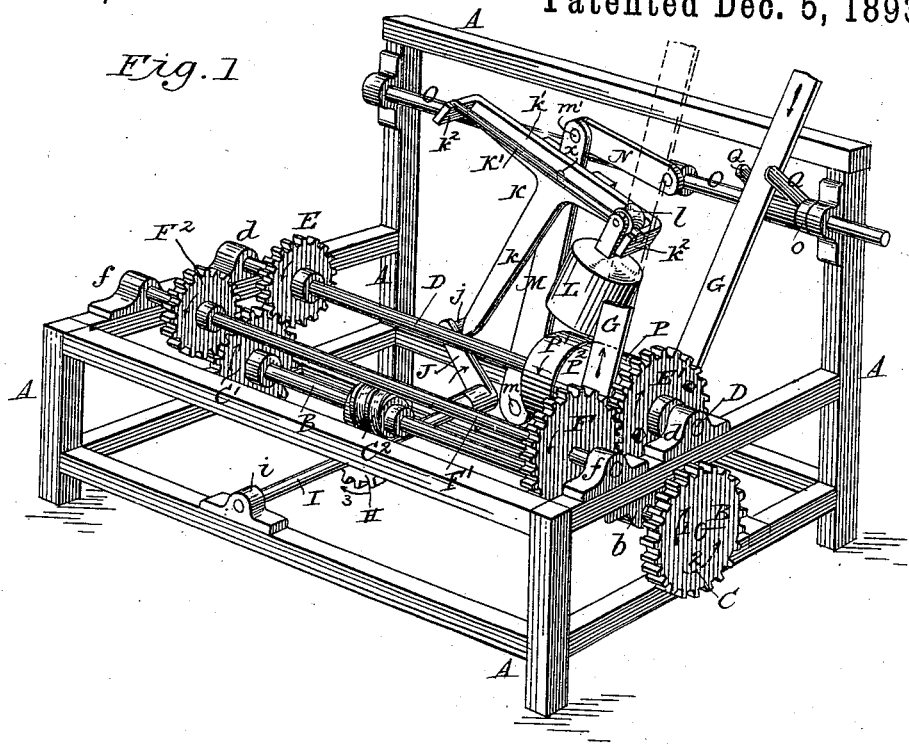
Figures 2, 3:
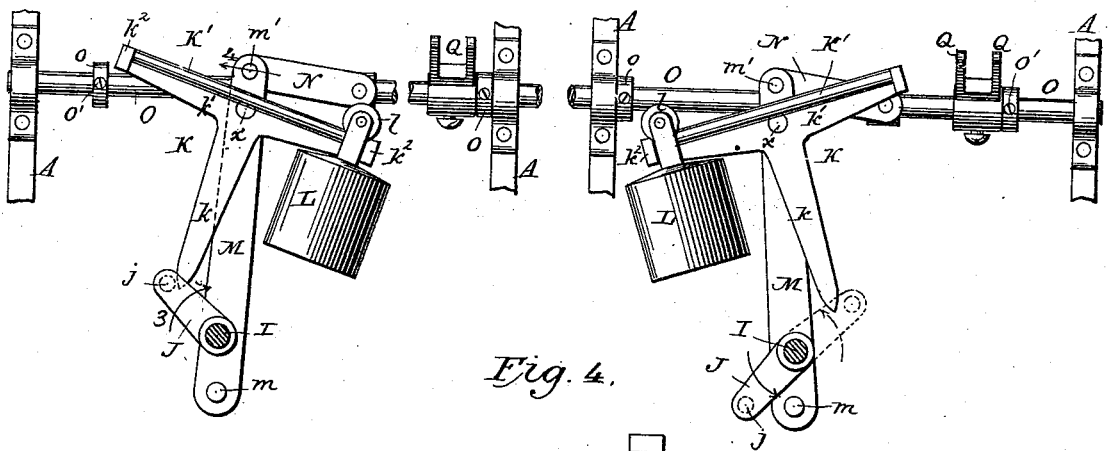
Figure 4:
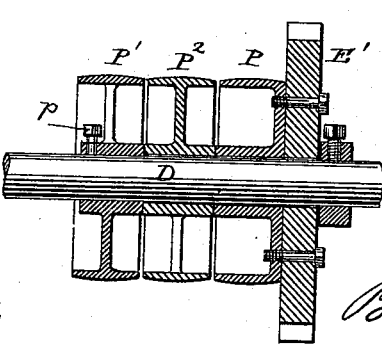

In the accompanying drawings,—Figure 1 is a perspective view of my improvements applied to mechanism for automatically shifting a belt from one pulley to another to reverse the movement of a driving shaft. Fig. 2 is a detail view of a part of the shipping mechanism, showing the main working parts in one position. Fig. 3 is a similar view showing the parts in another position. Fig. 4 is a detail view in section, showing the three pulleys employed, the gear wheel attached to one of the pulleys, and the manner of connecting the pulleys and gear wheel with the pulley shaft.

Any suitable frame A, may be employed in which to mount the operative parts of the apparatus. The shaft B, which I call the driving shaft, is mounted in suitable bearings $b$ in the frame, and carries two gear wheels C C', and a worm $C^2$, all of which are firmly secured or keyed to the shaft. The shaft D, which I call the pulley shaft, is mounted in bearings $d$, and carries two gear wheels E E', the wheel E' being somewhat larger than the wheel E. The gear wheel E, meshes with the gear C' on the driving shaft B, while the gear E' meshes with a gear wheel F, on a counter-shaft F', mounted in bearings $f$. The shaft F' also carries another gear wheel $F^2$ which meshes with the gear wheel C'. The pulley P, is mounted loosely on the shaft D, and is rigidly secured to the gear wheel E'. The pulley P' is secured to the shaft D, by a set screw $p$, or it may be secured in any other suitable way, and between the pulleys P and P', is interposed a loose pulley $P^2$. A belt G, which may connect with any suitable prime mover, extends over the pulleys, and may be made to operate on either one of them. The belt is supposed to move at all times in the direction indicated by the arrow. The gearing is such that when the belt surrounds the pulley P, which is loose on the shaft D, the driving shaft B, will be moved in the same direction, that is the direction indicated by arrow No. 1. When the belt surrounds the pulley $P^2$, motion will not be imparted to the mechanism, but when the belt surrounds the pulley P', the driving shaft will be moved in the direction indicated by the dotted arrow No. 2.

The gear wheel C may be connected with any apparatus to which it is desired to impart movement, in reverse directions.

I have applied my improved mechanism to apparatus for washing chips employed in the manufacture of beer. The worm $C^2$ meshes with a cog H, on a shaft I, arranged at right angles to the driving shaft B, in bearings $i$. At one end of the shaft is a crank-arm J, provided with an arm $j$, which is adapted to engage with the lower end of an arm $k$, on a T-shaped frame K. The arm $k$ projects downwardly from a top piece $k'$ having forwardly projecting arms $k^2$, which support a rail K', on which runs a pulley $l$, from which a weight L is suspended. The frame K, is pivoted centrally at $x$, to an upright lever M, pivoted at its lower end $m$ to the frame, and at its upper end pivotally connected at $m'$ with a link N, which at its opposite end is pivotally connected with a shipper rod O, which carries two parallel arms Q, through which the driving belt extends. The shipper rod O is provided with collars o, having set screws o' by which the movement of the rod may be regulated. It will be clear that the belt may be shifted from one pulley to another by moving the shipper rod horizontally to the desired extent, and in the proper direction.

I automatically effect the shipping of the belt by the mechanism above described, which operates as follows: Assuming the belt to be on the pulley P, and the driving shaft B to be turning in the direction indicated by arrow No. 2, the shaft I will rotate in the direction indicated by arrow No. 3, and the frame K, will be in the position indicated in Fig. 2. The continued rotation of the shaft causes the arm j to abut against the lower inclined end of the arm k, of the frame K. As the movement continues, the arm is moved about its pivot to such an extent that the rail K' first assumes a horizontal position, and then is moved to assume an inclined position opposite to that shown in Fig. 2. The weight will then by gravity ride down the rail to the opposite end of the frame, and then being on the opposite side of the lever arm M, will cause that lever arm to move to the left in the direction indicated by arrow No. 4, and cause the shipper rod to move in the same direction, thereby shifting the belt from pulley P to pulley P'. This pulley, being fast on the shaft D, will cause the shaft D, to move in an opposite direction. Likewise the shaft I, will be moved in an opposite direction until the crank arm j comes against the opposite side of the frame K, as indicated in dotted lines in Fig. 3, when the weight-carrying frame will be again shifted, the weight moving to the opposite side of the frame, causing the shipper rod to move the belt back to pulley P. In this way, a continuous motion in one direction of the driving belt may be made to communicate motion in opposite directions to a driving shaft, and to any mechanism or machinery connected therewith.

The mechanism herein shown and described is simple and efficient, and shows the best way now known to me of carrying out my invention, but the details of construction may be varied without departing from the novel features of my improvements.

I claim as my invention—

1. The combination of a shipper rod, a frame pivotally connected therewith, a rail carried by the frame, and a weight adapted to slide on the frame to opposite sides of the pivotal connection.

2. The combination of a shipper rod, a lever pivotally connected therewith and pivotally connected with a supporting frame, a rail projecting in opposite directions from said pivotal connection, and a weight carried by the rail and adapted to move to opposite ends thereof.

3. The combination of a pulley shaft on which is mounted a fast and loose pulley, a shipper rod carrying arms between which a driving belt extends, a frame pivotally connected with the shipper rod, a rail carried by the frame and projecting in opposite directions from said pivotal connection, a weight supported on the rail and adapted to move to opposite ends thereof, and mechanism connected with the pulley shaft and adapted to act upon the pivoted frame to shift its position, substantially as described.

4. The combination of the pulley shaft, fast and loose pulleys mounted thereon, a driving shaft, gearing connecting the driving shaft with the pulley shaft, a crank-arm-carrying shaft operatively connected with the driving shaft, a shipper rod, a frame pivotally connected therewith, a rail carried by the frame and projecting in opposite directions from said pivotal connection, a weight carried by the rail and adapted to move to opposite ends thereof, and an arm on said frame with which the crank arm is adapted to engage.

5. The combination of a pulley shaft, fast and loose pulleys mounted thereon, a driving shaft, a counter-shaft parallel with the driving shaft and the pulley shaft, gearing connecting one of the pulleys with the counter-shaft, gearing connecting the counter-shaft with the driving shaft, gearing connecting the pulley shaft with the driving shaft, a shipper rod, a lever to which it is pivotally connected, a T-shaped frame centrally pivoted to said lever, a rail carried by the frame and projecting in opposite directions from said pivotal connection, a weight carried by the rail and adapted to move to opposite ends thereof, a crank arm adapted to engage with the downwardly projecting arm of the T-shaped frame, and gearing connecting the crank arm with the driving shaft.

In testimony whereof I have hereunto subscribed my name.

WILLIBALD KUEBLER.

Witnesses:
LLOYD B. WIGHT,
JOHN C. DITTLER.